United States Patent [19]
Koenig et al.

[11] Patent Number: 5,251,512
[45] Date of Patent: Oct. 12, 1993

[54] DYNAMIC SHIFT CONTROL FOR AN AUTOMATIC TRANSMISSION

[75] Inventors: Melissa M. Koenig, Ann Arbor; William J. Vukovich, Ypsilanti, both of Mich.

[73] Assignee: General Motors Corporation, Detroit, Mich.

[21] Appl. No.: 910,488

[22] Filed: Jul. 8, 1992

Related U.S. Application Data

[63] Continuation-in-part of Ser. No. 776,030, Oct. 15, 1991, Pat. No. 5,152,192.

[51] Int. Cl.⁵ .............................................. B60K 41/22
[52] U.S. Cl. ...................................... 74/862; 74/856; 74/861; 74/866; 364/424.1
[58] Field of Search ................. 74/862, 866, 856, 861; 364/424.1

[56] References Cited

U.S. PATENT DOCUMENTS

| | | | |
|---|---|---|---|
| 4,285,252 | 8/1981 | Yamaki et al. | 74/862 |
| 4,338,666 | 7/1982 | Suzuki | 74/856 |
| 4,523,281 | 6/1985 | Noda et al. | 74/866 |
| 4,679,145 | 7/1987 | Beeck et al. | 364/424.1 |
| 4,789,936 | 12/1988 | Kurihora | 74/866 |
| 4,975,845 | 12/1990 | Mehta | 74/866 X |
| 4,982,822 | 1/1991 | Petzold et al. | 74/866 X |
| 5,152,192 | 10/1992 | Koenig et al. | 74/866 X |

FOREIGN PATENT DOCUMENTS 62-166122  7/1987  Japan ................................ 74/862

OTHER PUBLICATIONS

Christophorus N226/Nov. 1990–All About Tiptronic, pp. 16–20.

Primary Examiner—Leslie A. Braun
Assistant Examiner—David G. Henn
Attorney, Agent, or Firm—Mark A. Navarre

[57] ABSTRACT

An improved control, which dynamically adjusts the shift control parameters in response to an indication of the driving style of the vehicle operator. The driving style indication is used to form a dynamic shift factor DSF, which is used to ratiometrically schedule the shift pattern, line pressure and desired shift time between predefined Normal and Performance values to provide a shift control parameter uniquely suited to the driving style of the operator of the vehicle.

6 Claims, 10 Drawing Sheets

| GEAR | RATIO | C1 | C2 | C3 | C4 | C5 | OC | CR |
|---|---|---|---|---|---|---|---|---|
| 1st | 3.61 | ON | OFF | OFF | ON | OFF | ON | OFF |
| 2nd | 1.85 | ON | ON | OFF | ON | OFF | ON | OFF |
| 3rd | 1.37 | ON | ON | OFF | ON | ON | OFF | OFF |
| 4th | 1.00 | ON | ON | ON | OFF | OFF | ON | OFF |
| 5th | 0.74 | ON | ON | ON | OFF | ON | OFF | OFF |
| P/N | — | OFF | OFF | OFF | OFF | OFF | ON | OFF |
| R | -2.06 | OFF | OFF | ON | OFF | OFF | ON | ON |

FIG. 2

| SOLENOID STATES | | | |
|---|---|---|---|
| GEAR | SOLENOID A | SOLENOID B | SOLENOID C |
| 1st | ON | OFF | ON |
| 2nd | OFF | OFF | ON |
| 3rd | OFF | ON | ON |
| 4th | OFF | OFF | OFF |
| 5th | OFF | ON | OFF |

FIG. 3

DYNAMIC SHIFT CONTROL FOR AN AUTOMATIC TRANSMISSION

This is a Continuation-in-Part of U.S. Ser. No. 07/776,030, filed Oct. 15, 1991, now U.S. Pat. No. 5,152,192 issued on Oct. 6, 1992.

This invention relates to a control of shift timing and pressure in a motor vehicle automatic transmission, and more particularly, to a control which varies in relation to the manner in which the vehicle is driven.

BACKGROUND OF THE INVENTION

Automatic transmissions of the type addressed by this invention, include gear elements for defining several different forward speed ratios between input and output shafts of the transmission, and electrohydraulic controls for shifting among the various ratios in relation to vehicle speed and load indications. The shifting is effected with a number of fluid operated torque transmitting devices, referred to herein as clutches, which the controls engage and disengage according to a predefined pattern to establish a desired speed ratio.

The various speed ratios of the transmission are typically defined in terms of the ratio Ni/No, where Ni is the input shaft speed and No is the output shaft speed. Speed ratios having a relatively high numerical value provide a relatively low output speed and are generally referred to as lower speed ratios; speed ratios having a relatively low numerical value provide a relatively high output speed and are generally referred to as upper speed ratios. Accordingly, shifts from a given speed ratio to a lower speed ratio are referred to as downshifts, while shifts from a given speed ratio to a higher speed ratio are referred to as upshifts.

A first aspect of shift control is shift scheduling, also known as shift pattern generation. This function is generally carried out by comparing specified vehicle operating parameters (speed and load) to predefined thresholds to determine when shifting is appropriate. Multiple sets of predefined thresholds may be used in connection with a driver preference (Normal/Performance) switch, or control logic which infers the driving style of the operator.

A second aspect of shifting is fluid pressure control. In most transmissions having electrohydraulic controls, the fluid pressure output of a driven pump is regulated to a scheduled pressure (line pressure) and then distributed to the various clutches of the transmission via electrically operated shift valves and timing devices such as hydraulic accumulators. The scheduled pressure is generally speed and load (torque) dependent, and operates not only to maintain adequate torque capacity in engaged clutches, but to control clutch engagement rate during shifting. Since the clutch engagement rate affects shift feel, certain transmission controls increase the normally scheduled pressure, at least during shifting, when a sporty or performance shift feel is desired.

In most transmission pressure controls, an adaptive trim or correction of the scheduled pressure can be employed as a means of compensating for variability associated with part-to-part tolerances, wear, etc. One such control, set forth in the U.S. Pat. No. 4,283,970 to Vukovich, issued Aug. 18, 1981, and assigned to the assignee of the present invention, develops an adaptive correction of the scheduled line pressure based on a deviation of the actual shift time from a desired shift time characteristic of high quality shift feel. In such a system, alternate desired shift time schedules may also have to be employed, depending on whether Normal or Performance pressures are selected.

SUMMARY OF THE PRESENT INVENTION

The present invention is directed to an improved shift control which dynamically adjusts the shift control parameters in response to an indication of the driving style of the vehicle operator. The driving style indication is used to form a dynamic shift factor DSF, which is used to ratiometrically schedule the shift pattern, line pressure and desired shift time between predefined values corresponding to diverse modes of operation, referred to herein as Normal and Performance. This provides a continuum of shift control parameters uniquely suited to the driving style of the operator of the vehicle.

In the illustrated embodiment, the driving style indication is based on a measure of the average peak acceleration during specified operation of the vehicle. To determine the average peak acceleration, the longitudinal acceleration of the vehicle is continuously determined in the course of vehicle operation. The peak or maximum acceleration values occurring in successive ratio-dependent time intervals are identified and accumulated to form cumulative and average peak acceleration terms, ACCSUM and AVPACC.

The ratio-dependency of the time intervals over which the peak acceleration values are identified causes a faster updating of the average peak acceleration AVPACC, and hence the dynamic shift factor DSF, in the lower ratios. This reflects an underlying recognition that the peak acceleration observed in the lower ratios provides a more reliable indication of the driver preference than that observed in higher ratios. To this end, the acceleration time interval increases with increasing ratio, with little or no accumulation in the higher ratios.

A differential gain in the accumulation of peak acceleration may be employed to bias the shift parameter schedules toward the Normal or Performance levels. In the illustrated embodiment, the control is biased toward the Performance mode schedule by accumulating peak acceleration values in excess of the average peak acceleration at a higher gain than peak acceleration values below the average peak acceleration.

BRIEF DESCRIPTION OF THE DRAWINGS

FIG. 2 is a state diagram for the clutches of the transmission depicted in FIGS. 1a–1b.

FIG. 3 is a chart depicting the electrical state changes required for shifting from one speed ratio to another.

DETAILED DESCRIPTION OF THE INVENTION

Figure 1A:
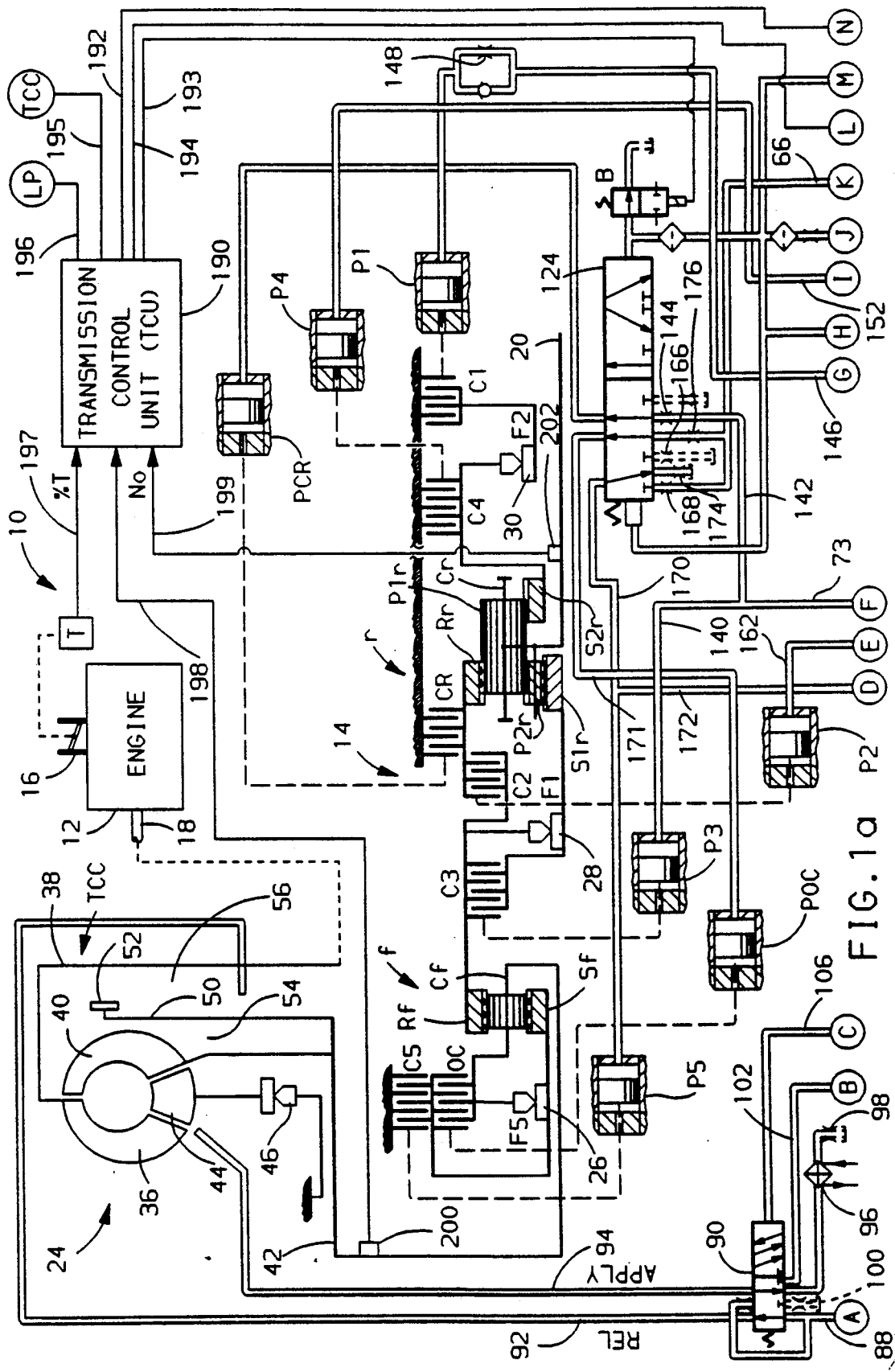
FIGS. 1a–1b form a schematic diagram of a five-speed automatic transmission controlled in accordance with this invention by a computer-based control unit.
Figure 1B:
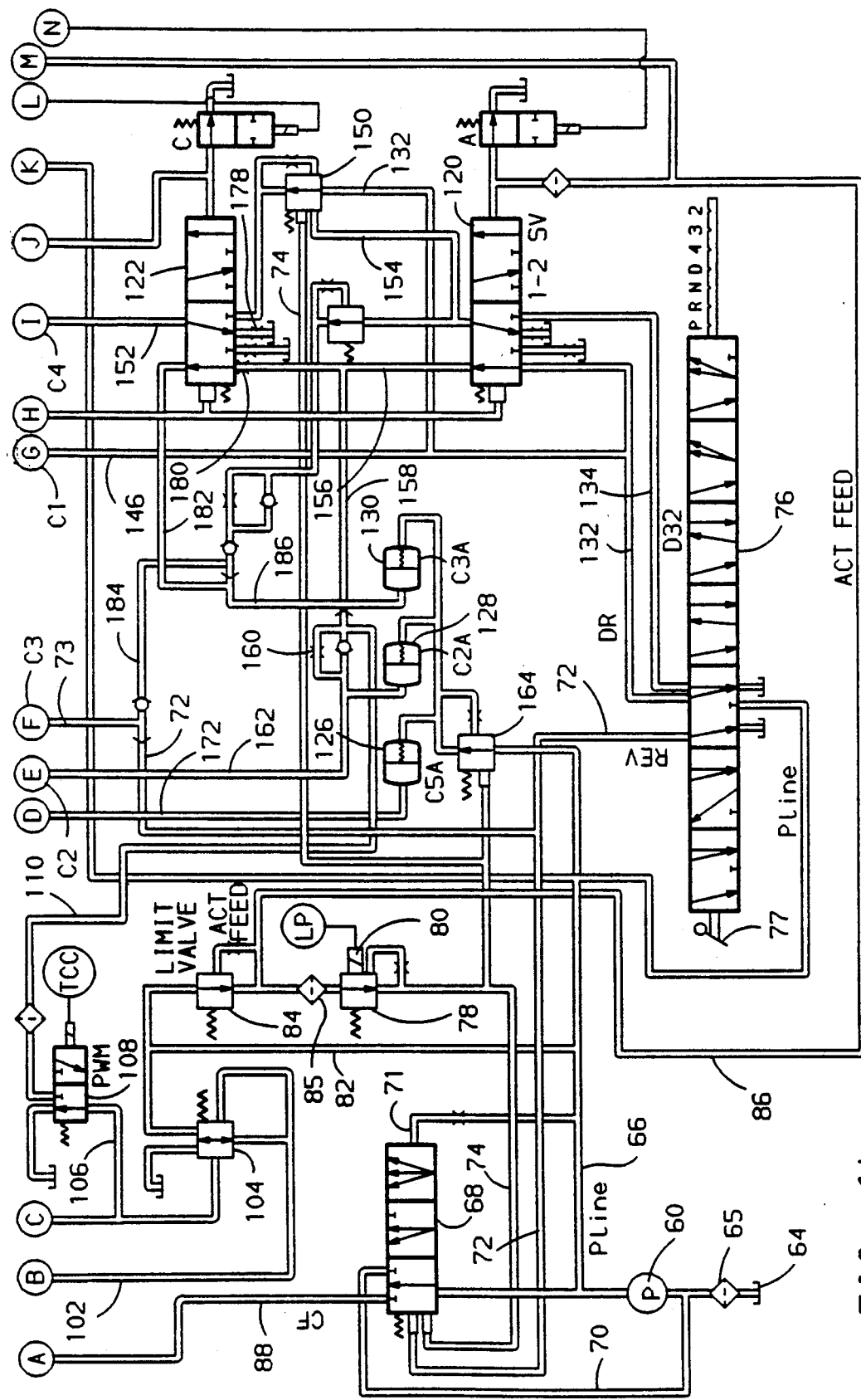

Referring now to FIGS. 1a–1b of the drawings, the reference numeral 10 generally designates a motor vehicle drivetrain including an engine 12 and a planetary transmission 14 having a reverse speed ratio and five forward speed ratios. Engine 12 includes a throttle mechanism 16 mechanically connected to an operator manipulated device, such as an accelerator pedal (not shown), for regulating the air intake of the engine. The engine 12 is fueled by a conventional method in relation to the air intake to produce output torque in proportion thereto. Such torque is applied to the transmission 14 through the engine output shaft 18. The transmission 14, in turn, transmits engine output torque to an output shaft 20 through a torque converter 24 and one or more of the fluid operated clutches C1–C5, OC, Reverse clutch CR, and one-way clutches 26–30, such clutches being applied or released according to a predetermined schedule for establishing a desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the turbine shaft 42. A stator member 44 redirects the fluid which couples the impeller 36 to the turbine 40, the stator being connected through a one-way device 46 to the housing of transmission 14.

The torque converter 24 also includes a clutch TCC comprising a clutch plate 50 secured to the turbine shaft 42. The clutch plate 50 has a friction surface 52 formed thereon adaptable to be engaged with the inner surface of the input shell 38 to form a direct mechanical drive between the engine output shaft 18 and the turbine shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38, thereby engaging the TCC to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38, as shown in FIG. 1a, thereby uncoupling such mechanical drive connection and permitting slippage between the impeller 36 and the turbine 40.

The turbine shaft 42 is connected as an input to the carrier Cf of a forward planetary gearset f. The sun Sf is connected to carrier Cf via the parallel combination of one-way clutch F5 and friction clutch OC. The clutch C5 is selectively engageable to ground the sun Sf. The ring Rf is connected as an input to the sun S1r of a compound rearward planetary gearset r via the parallel combination of one-way clutch F1 and friction clutch C3. The clutch C2 selectively connects the forward gearset ring Rf to rearward gearset ring Rr, and the Reverse clutch CR selectively grounds the ring Rr. The sun S2r is selectively grounded by clutch C4 or by clutch C1 through the one-way clutch F2. The pinion carrier Cr mechanically couples the pinion gears P1r, P2r and is connected as an output to shaft 20.

The various speed ratios and the clutch states required to establish them are set forth in the chart of FIG. 2. Referring to that Figure, it is seen that the Park/Neutral condition is established by releasing all of the clutches with the exception of clutch OC. A garage shift to Reverse is effected by engaging the C3 and OC clutches. In the forward speed ranges, a garage shift to 1st is effected by engaging the clutches C1 and C4. In this case, the forward gearset f is locked up and the one-way clutch F1 applies the turbine speed Nt as an input to the sun element Sr of rearward gearset r, providing a Ni/No ratio of 3.61.

As the vehicle speed increases, an upshift from 1st to 2nd is effected simply by engaging clutch C2; the one-way clutch F1 overruns as soon as on-coming clutch C2 develops sufficient torque capacity. The forward gearset f remains locked up, and the clutch C2 applies the turbine speed Nt as an input to the ring element Rr of rearward gearset r to provide a Ni/No ratio of 1.85. Downshifting from 2nd to 1st merely involves releasing clutch C2.

The upshift from 2nd to 3rd is effected by engaging clutch C5 and releasing clutch OC so that the forward gearset operates as an overdrive, thereby providing a Ni/No ratio of 1.37. Downshifting from 3rd to 2nd is effected by releasing clutch C5 and engaging clutch OC to return the forward gearset f to a lock-up condition.

The upshift from 3rd and 4th is effected by releasing clutch C5 and engaging clutch OC to return the forward gearset f to a lock-up condition, while releasing clutch C4 and engaging clutch C3 to lock-up the rearward gearset r, one-way clutch F2 releasing the rear planet axis Pr. In this case, the turbine speed Nt is transmitted directly to output shaft 20 for a Ni/No ratio of 1.00. The downshift 4th to 3rd is effected by releasing clutch OC and engaging clutch C5 to return the forward gearset f to an overdrive condition, while releasing clutch C3 and engaging clutch C4 to apply the turbine speed Nt as an input to the ring element Rr.

Completing the shift analysis, the upshift from 4th to 5th is effected by engaging clutch C5 (and releasing clutch OC if engine braking is selected) to operate the forward gearset f in an overdrive condition, thereby providing a Ni/No ratio of 0.74. Downshifting from 5th to 4th is effected by releasing clutch C5 (and engaging clutch OC if engine braking is selected).

A positive displacement hydraulic pump 60 is mechanically driven by the engine output shaft 1B. Pump 60 receives hydraulic fluid at low pressure from the fluid reservoir 64 and filter 65, and supplies line pressure fluid to the transmission control elements via output line 66. A pressure regulator valve (PRV) 68 is connected to the pump output line 66 and serves to regulate the line pressure by returning a controlled portion of the line pressure to reservoir 64 via the line 70. The PRV 68 is biased at one end by orificed line pressure in line 71 and at the other end by the combination of a spring force, a Reverse ratio fluid pressure in line 72 and a controlled bias pressure in line 74.

The Reverse fluid pressure is supplied by a Manual Valve 76, described below. The controlled bias pressure is supplied by a Line Pressure Bias Valve 78 which develops pressure in relation to the current supplied to electric force motor 80. Line pressure is supplied as an input to valve 78 via line 82, a pressure limiting valve 84 and filter 85. The limited line pressure, referred to as ACT FEED pressure, is also supplied as an input to other electrically operated actuators of the control system via line 86. With the above-described valving arrangement, it will be seen that the line pressure of the transmission is electrically regulated by force motor 80.

In addition to regulating line pressure, the PRV 68 develops a regulated converter feed (CF) pressure for the torque converter 24 in line 88. The CF pressure is supplied as an input to TCC Control Valve 90, which in turn directs the CF pressure to the release chamber 56 of torque converter 24 via line 92 when open converter operation is desired. In this case, the return fluid from torque converter 24 is exhausted via line 94, the TCC Control Valve 90, an oil cooler 96 and an orifice 98. When closed converter operation is desired, the TCC Control Valve 90 exhausts the release chamber 56 of torque converter 24 to an orificed exhaust 100, and supplies a regulated TCC apply pressure in line 102 to the apply chamber 54, thereby engaging the TCC. The TCC apply pressure in line 102 is developed from line pressure by a TCC Regulator Valve 104.

Both the TCC Control Valve 90 and the TCC Regulator Valve 104 are spring biased to effect the open converter condition, and in each case, the spring force is opposed by an electrically developed control pressure in line 106. The control pressure in line 106 is developed by the solenoid operated TCC Bias Valve 108, through a ratiometric regulation of the fluid pressure in line 110. When closed converter operation is desired, the solenoid of TCC Bias Valve 108 is pulse-width-modulated at a controlled duty cycle to ramp up the bias pressure in line 106. Bias pressures above the pressure required to shift the TCC Control Valve to the closed-converter state are used to control the TCC apply pressure developed in line 102 by TCC Regulator Valve 104. In this way, the TCC Bias Valve 108 is used to control the torque capacity of the TCC when closed converter operation is desired.

The friction clutches C1–C5, OC and CR are activated by conventional fluid operated pistons P1–P5, POC and PCR, respectively. The pistons in turn, are connected to a fluid supply system comprising the Manual Valve 76 referred to above, the Shift Valves 120, 122 and 124, and the Accumulators 126, 128 and 130. The Manual Valve 76 develops supply pressures for Reverse (REV) and the various forward ranges (DR, D32) in response to driver positioning of the transmission range selector 77. The REV, DR and D32 pressures, in turn, are supplied via lines 72, 132 and 134 to the various Shift Valves 120–124 for application to the fluid operated pistons P1–P5, POC and PCR. The Shift Valves 120, 122 and 124 are each spring biased against controlled bias pressures, the controlled bias pressures being developed by the solenoid operated valves A, C and B. The accumulators 126, 128 and 130 are used to cushion the apply, and in some cases the release, of clutches C5, C2 and C3, respectively.

A chart of the ON/OFF states of valves A, C and B for establishing the various transmission speed ratios is given in FIG. 3. In Neutral and Park, the solenoids A, B and C are all off. In this condition, line pressure is supplied to clutch piston POC through orifice 176, but the remaining clutches are all disengaged. Reverse fluid pressure, when generated by Manual Valve 76 in response to driver displacement of range selector 77, is supplied directly to clutch piston P3 via lines 72, 73 and 140, and to clutch piston PCR via lines 72, 142, orifice 144 and Shift Valve 124.

A garage shift to the forward (Drive) ranges is effected when Manual Valve 76 is moved to the D position, connecting line pressure to the DR pressure supply line 132. The DR pressure is supplied to the clutch piston Pl via line 146 and orifice 148 to progressively engage clutch C1. At the same time, Solenoid Operated Valves A and C are energized to actuate Shift Valves 120 and 122. The Shift Valve 122 directs DR pressure in line 132 to clutch piston P4 via Regulator Valve 150 and line 152. The Shift Valve 120 supplies a bias pressure to the Regulator Valve 150 via line 154 to boost the C4 pressure. In this way, clutches C1, C4 and OC are engaged to establish 1st speed ratio.

Referring to the chart of FIG. 3, a 1-2 upshift is effected by deenergizing Solenoid Operated Valve A to return Shift Valve 120 to its default state. This routes DR pressure in line 132 to the clutch piston P2 via Shift Valve 120, lines 156, 158 and 162, and orifice 160 to engage the clutch C2. Line 162 is also connected as an input to accumulator 128, the backside of which is maintained at a regulated pressure developed by valve 164. The engagement of clutch C2 is thereby cushioned as the C2 apply pressure, resisted by spring force, strokes the piston of accumulator 128. Of course, a 2-1 downshift is effected by energizing the Solenoid Operated Valve A.

Referring again to the chart of FIG. 3, a 2-3 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch C5. Line 170 is connected via line 172 as an input to accumulator 126, the backside of which is maintained at a regulated pressure developed by valve 164. The engagement of clutch C5 is thereby cushioned as the C5 apply pressure, resisted by spring force, strokes the piston of accumulator 126. Of course, a 3-2, downshift is effected by deenergizing the Solenoid Operated Valve B.

Referring again to the chart of FIG. 3, a 3-4 upshift is effected by deenergizing Solenoid Operated Valves B and C to return Shift Valves 124 and 122 to their default positions, as depicted in FIGS. 1a-1b. The Shift Valve 124 thereby (1) exhausts clutch piston P5 and accumulator 126 via line 170 and orifice 174 to release clutch C5, and (2) supplies pressure to clutch piston POC via lines 66 and 171 and orifice 176 to engage clutch OC. The Shift Valve 122 (1) exhausts clutch piston P4 via line 152 and orifice 178 to release clutch C4, and (2) supplies DR pressure in line 132 to clutch piston P3 via Shift Valve 120, orifice 180 and lines 182, 184, 73 and 140 to engage clutch C3. Line 182 is connected via line 186 as an input to accumulator 130, the backside of which is maintained at a regulated pressure developed by valve 164. The engagement of clutch C3 is thereby cushioned as the C3 apply pressure, resisted by spring force, strokes the piston of accumulator 130. Of course, a 4-3 downshift is effected by energizing the Solenoid Operated Valves B and C.

Referring again to the chart of FIG. 3, a 4-5 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch P5. As indicated below, line 170 is also connected via line 172 as an input to accumulator 126, which cushions the engagement of clutch C5 as the C5 apply pressure, resisted by spring force, strokes the piston of accumulator 126. Of course, a 5-4 downshift is effected by deenergizing the Solenoid Operated Valve B.

The Solenoid Operated Valves A, B and C, the TCC Bias Valve 108 and the Line Pressure Bias Valve 78 are all controlled by a computer-based Transmission Control Unit (TCU) 190 via lines 192-196. As indicated above, the valves A, B and C require simple on/off controls, while the valves 108 and 78 are pulse-width-modulated (PWM). The control is carried out in response to a number of input signals, including an engine throttle signal %T on line 197, a turbine speed signal Nt on line 198 and an output speed signal No on line 199. The throttle signal is based on the position of engine throttle 16, as sensed by transducer T; the turbine speed signal is based on the speed of turbine shaft 42, as sensed by sensor 200; and the output speed signal is based on the speed of output shaft 20, as sensed by sensor 202. In carrying out the control, the TCU 190 executes a series of computer program instructions, represented by the flow diagrams of FIGS. 8, 9a-9b and 10-12 described below.

As indicated above, shifting among the forward speed ratios is coordinated through the use of Normal and Performance shift pattern schedules, or look-up tables, which provide predefined threshold values for comparison with measured vehicle parameters. In the illustrated embodiment, the Normal and Performance shift pattern look-up tables store upshift and downshift vehicle speed values for each ratio as a function of the engine throttle position. If the measured vehicle speed exceeds the selected upshift speed value, an upshift to the next higher ratio is initiated. If the measured vehicle speed falls below the selected downshift speed value, a downshift to the next lower ratio is initiated. Normal and Performance look-up tables are also provided for the control of transmission line pressure solenoid LP and the desired shift times employed in adaptive pressure control.

Figure 4A:
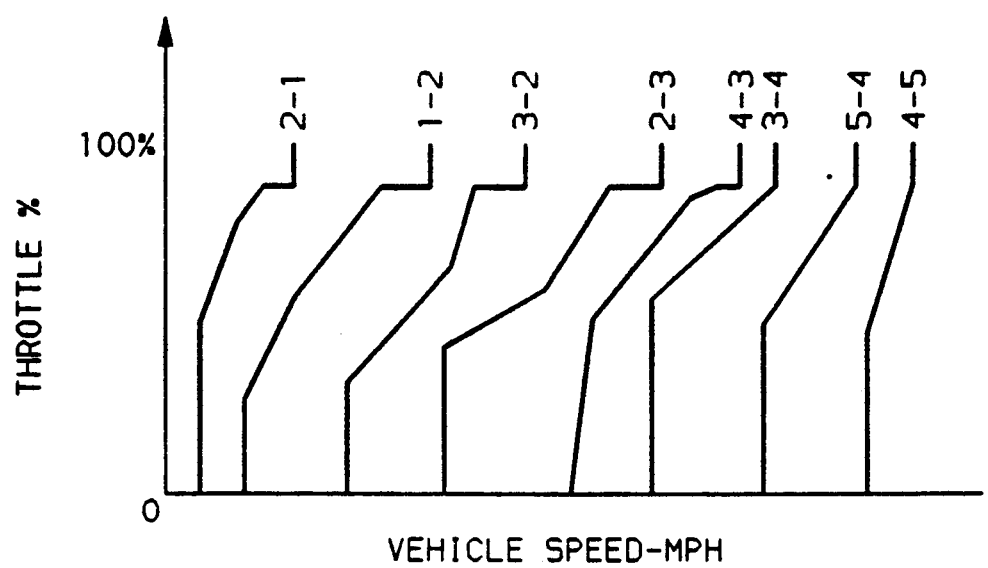
FIGS. 4a–4b graphically depict normal and performance shift patterns.
Figure 4B:
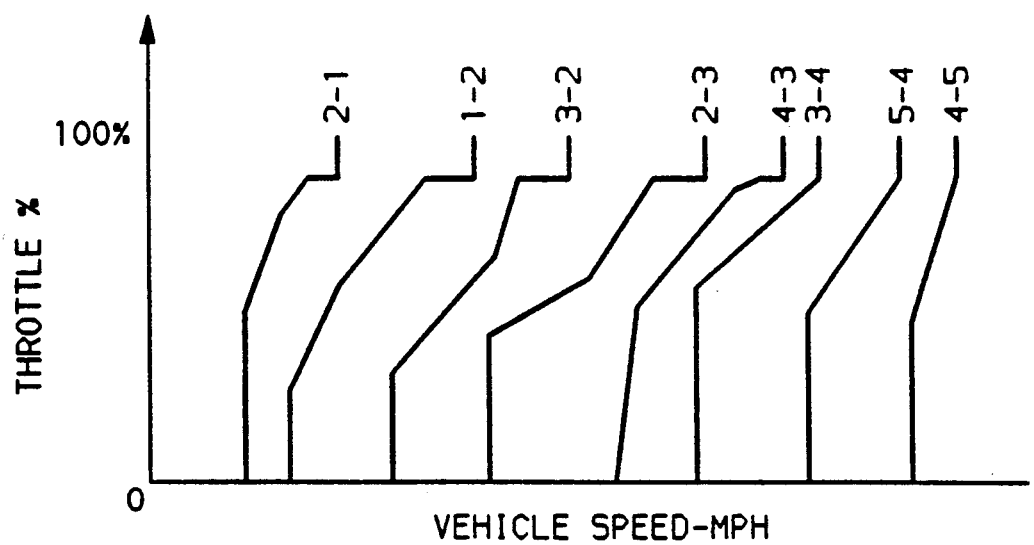

Representative look-up tables for Normal and Performance modes are graphically depicted in FIGS. 4a and 4b, respectively. In each case, the upshift speed values are designated as 1-2, 2-3, 3-4 and 4-5; the downshift speed values are designated as 5-4, 4-3, 3-2 and 2-1. Notably, both upshift and downshift speed values are higher in the Performance mode than in the Normal mode. Consequently, the Performance mode table operates to extend operation in the lower speed ratios, compared to the Normal mode table. Similarly, the Performance mode line pressure table provides increased line pressure, compared to the Normal mode, to achieve a Performance shift feel. As also indicated above, the Performance mode desired shift times, stored as a function of engine throttle %T for each forward ratio, provide correspondingly reduced shift times to reflect the increased line pressure.

In conventional practice, a driver preference switch is employed to select the appropriate shift pattern table—that is, Normal or Performance. Alternately, some control logic may be employed to infer which table is most appropriate. Also, one or more intermediate shift pattern tables have been employed to bridge the transition between Normal and Performance.

The objective of this invention is to provide a shift control system in which the parameters used to schedule the shift are dynamically and ratiometrically adjusted between the predefined Normal and Performance levels in response to an indication of the driving style of the operator of the vehicle. When the driving style is relatively moderate or restrained, transmission shifting is carried out using a set of normal or economy-oriented control parameters. When the driving style is relatively extreme or unrestrained, transmission shifting is carried out using a set of sport or performance-oriented control parameters. When the operator's driving style is intermediate the two extremes, transmission shifting is carried out using a set of control parameters ratioetrically intermediate the economy-oriented and performance-oriented control parameters. The result is a shift control parameter uniquely suited to the driving style of the operator of the vehicle.

In the illustrated embodiment, the indication of operator driving style is based on a measure of the average peak acceleration of the vehicle during operation in the lower forward speed ratios of transmission 14. To determine the indication of average peak acceleration, the longitudinal acceleration of the vehicle is continuously determined in the course of vehicle operation. The peak, or maximum, acceleration values occurring in successive ratio-dependent time intervals are identified and accumulated to form cumulative and average peak acceleration terms, ACCSUM and AVPACC.

The ratio-dependency of the time intervals over which the peak acceleration values are identified causes a faster updating of the average peak acceleration AVPACC, and hence the shift control parameters, in the lower ratios. This reflects an underlying recognition that the peak acceleration observed in the lower ratios provides a more reliable indication of the driver preference than that observed in higher ratios. To this end, the acceleration time interval increases with increasing ratio, with little or no accumulation in the higher ratios.

Figure 5:
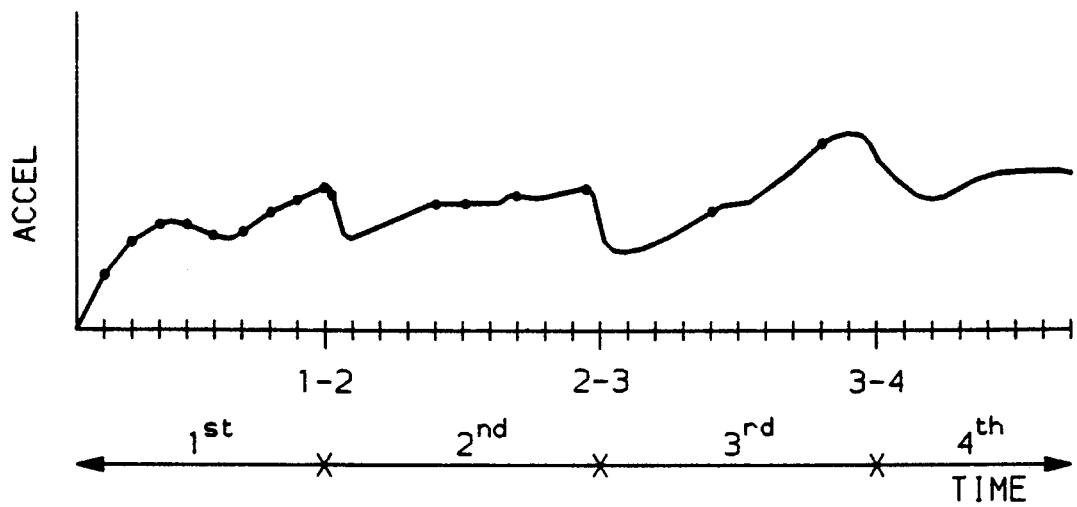
FIG. 5 graphically depicts the identification of peak acceleration values over a period of time.

The above-described operation is graphically illustrated in FIG. 5, which depicts vehicle acceleration ACCEL over an extended time interval involving successive 1-2, 2-3 and 3-4 upshifts, indicated below the time axis. The vertical reference lines intersecting the acceleration trace subdivide the time scale into a series of successive time intervals, the duration of which varies with the current ratio. The time intervals during operation in second (2nd) gear are approximately twice as long as during first (1st) gear, and the time intervals during operation in third (3rd) gear are approximately twice as long as during second (2nd,) gear. The control unit 190 identifies the maximum or peak acceleration value MAXACCEL observed in each interval, as denoted by the dots on the acceleration trace in FIG. 5.

Figure 7:
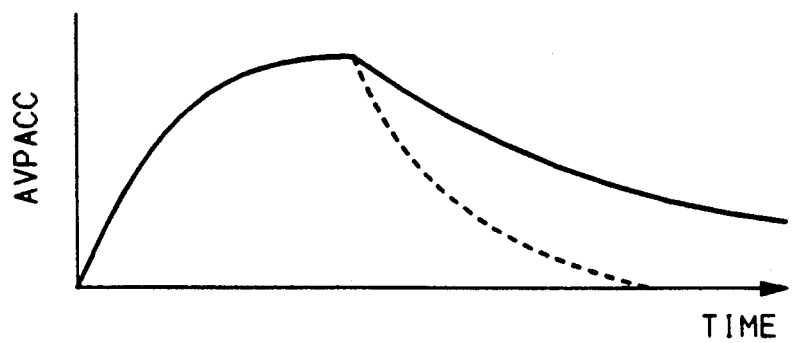
FIG. 7 graphically depicts the accumulation of peak acceleration values.

The peak acceleration values (MAXACCEL) are accumulated and averaged to form an average peak acceleration term, AVPACC. The average peak acceleration is then normalized, as shown in FIG. 7, to form a dynamic shift factor DSF. The dynamic shift factor is then used to ratiometrically schedule the shift pattern, line pressure and desired shift time between the predefined Normal and Performance values. This provides a continuum of shift control parameters uniquely suited to the driving style of the operator of the vehicle.

In the illustrated embodiment, a differential gain in the accumulation of the peak acceleration values is employed to bias the shift parameter schedules toward the Performance values. This is achieved by accumulating peak acceleration values in excess of the average peak acceleration at a higher gain than peak acceleration values below the average peak acceleration. The effect of the differential gain is graphically illustrated in FIG. 7, which depicts the average peak acceleration over an extended period of performance oriented t0-t1 and economy-oriented t1-t2 driving. With equivalent gains on acceleration and deceleration, the average acceleration term during economy-oriented driving would follow the broken trace, quickly returning the control to economy-oriented (Normal) shift parameters. However, with the differential gain feature, the performance-oriented shift parameter scheduling is maintained over a longer period of time, as indicated by the solid trace. This feature, combined with the ratio-dependency of the peak acceleration time intervals, has been found to provide a shift parameter schedule which closely satisfies driver expectations.

Figure 8:
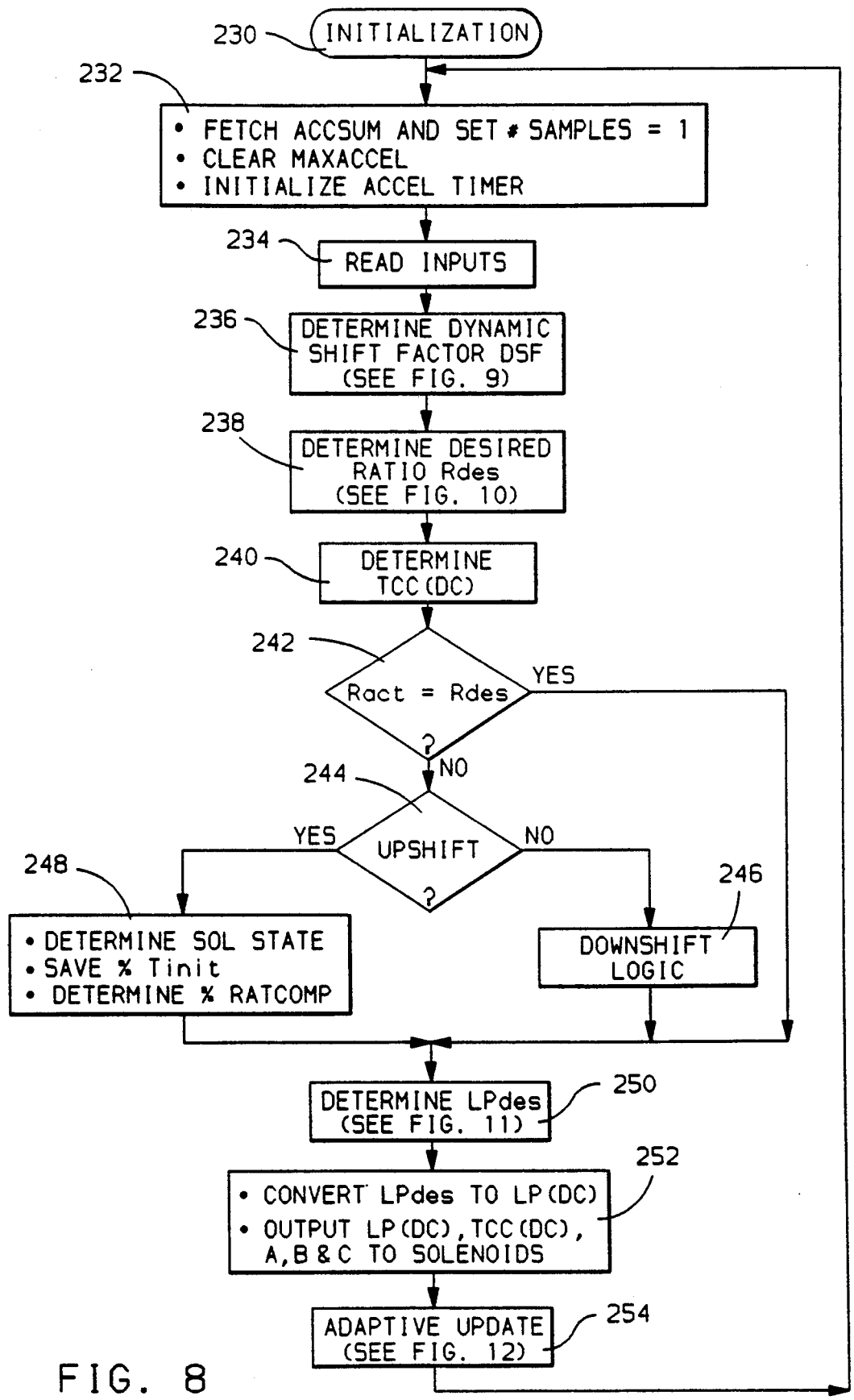
FIGS. 8, 9a–9b and 10–12 depict flow diagrams representative of computer program instructions executed by the control unit of FIG. 1a in carrying out the control of this invention.

Referring now to FIGS. 8, 9a-9b and 10-12, the flow diagram of FIG. 8 represents a main or executive computer program which is periodically executed in the course of vehicle operation in carrying out the control of this invention. The blocks 230-232 designates a series of program instructions executed at the initiation of each period of vehicle operation for setting various terms and timer values to an initial condition. Specific to the control of this invention, the block 232 fetches an accumulated peak acceleration value ACCSUM from a previous period of vehicle operation, sets the number of acceleration samples #SAMPLES t one, clears the peak acceleration term MAXACCEL, and initializes the acceleration interval timer (ACCEL TIMER) for the first forward ratio. Thereafter, the blocks 234-254 are repeatedly executed during the period of vehicle operation, as indicated by the flow diagram line 256.

First, the block 234 is executed to read the various inputs referenced in FIG. 1a. As detailed more fully in the flow diagram of FIGS. 9a-9b, the block 236 then computes the vehicle acceleration, ultimately determining the value of a dynamic shift factor DSF. Then, the blocks 238-240 determines the desired speed ratio Rdes and the torque converter clutch duty cycle TCC(DC). As detailed more fully in the flow diagram of FIG. 10, the desired ratio Rdes is determined in relation to the comparison of measured vehicle speed values with threshold speed values determined in relation to the engine throttle setting %T and the dynamic shift factor DSF. The torque converter clutch duty cycle TCC(DC) may be determined as a function of the throttle position, output speed No and the difference between input and output speeds Ni and No.

If the actual ratio Ract—that is, Ni/No—not equal to the desired ratio Rdes, as determined at block 242, the blocks 244-248 are executed to perform the appropriate logic for downshifting (block 246) or upshifting (block 248). In either event, the required shift solenoid state is determined as indicated at block 248. Additionally, in the case of an upshift, the throttle setting at the onset of the shift (% Tinit) is stored, and the percent of ratio completion (% RATCOMP) is computed.

In both shifting and nonshifting modes of operation, the blocks 250-254 are then executed to determine the desired line pressure LPdes, to convert the desired line pressure LPdes to a solenoid duty cycle LP(DC), to output the various duty cycles and discrete solenoid states to the solenoid operated valves described above in reference to FIGS. 1a-1b, and to update the adaptive line pressure correction cells. Block 250 is set forth in further detail in the flow diagram of FIG. 11, and block 254 is set forth in further detail in the flow diagram of FIG. 12.

Figure 9A:
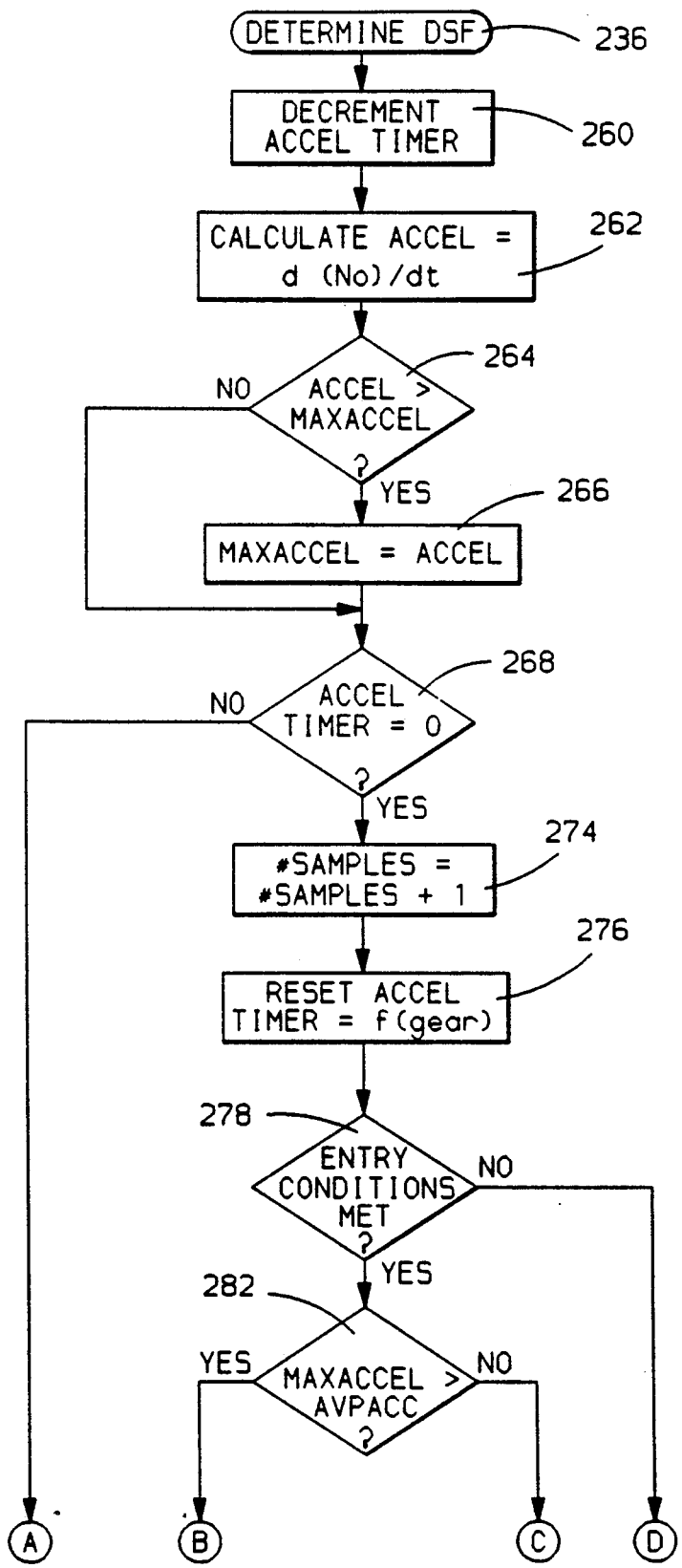
Figure 9B:
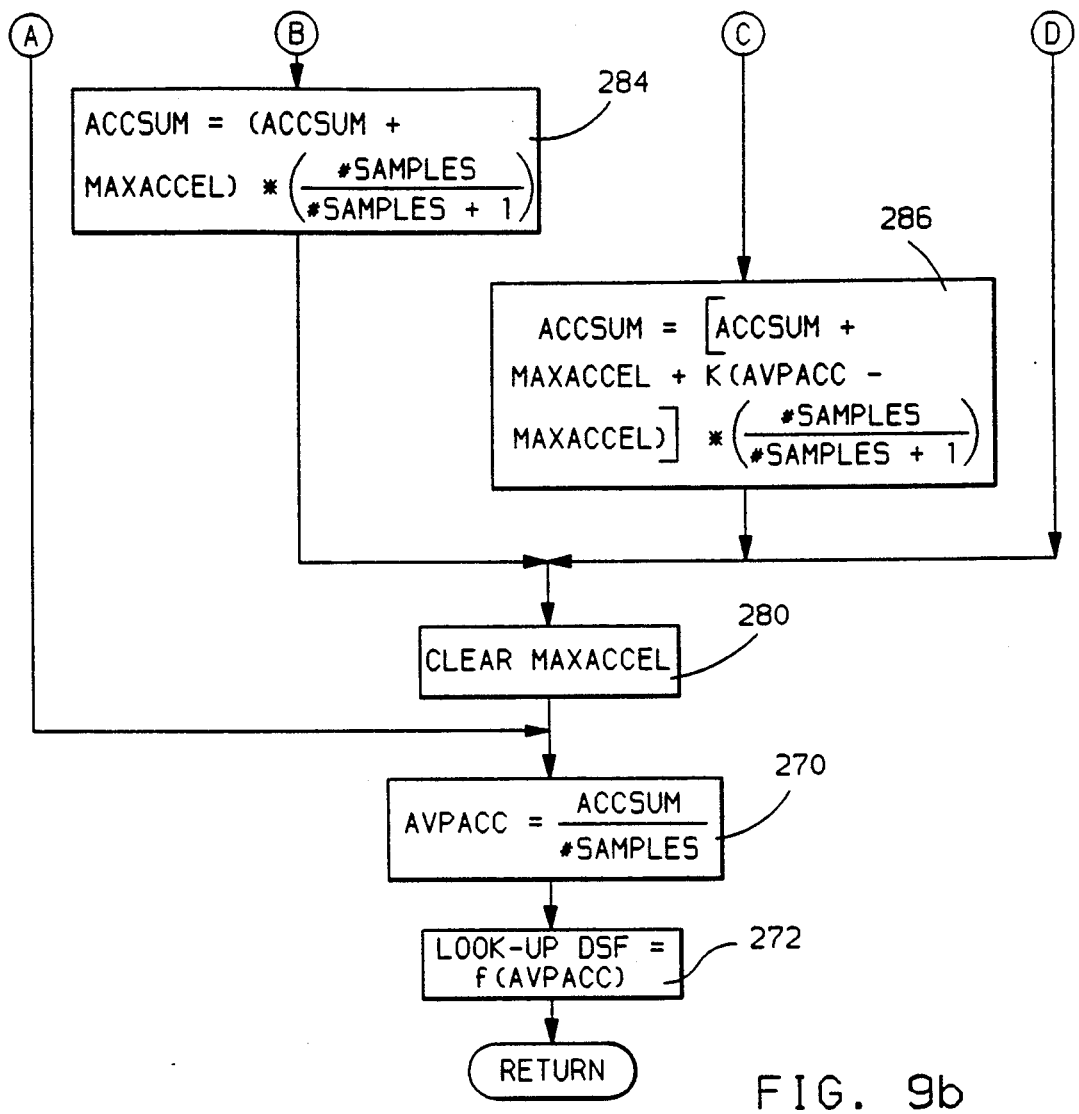

Referring to the dynamic shift factor determination flow diagram of FIGS. 9a-9b, the blocks 260 and 262 are first executed to decrement the acceleration interval timer ACCEL TIMER, and to calculate the acceleration ACCEL based on the change in output speed No since the previous loop of the program. Blocks 264-266 identify the peak acceleration value by setting the term MAXACCEL equal to ACCEL whenever ACCEL exceeds the current value of MAXACCEL.

Figure 6:
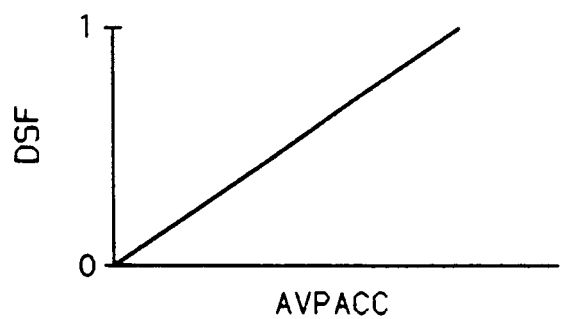
FIG. 6 graphically depicts the dynamic shift factor DSF as a function of the average peak acceleration AVPACC.

If the ACCEL TIMER has not yet been decremented to zero, as determined at block 268, blocks 270 and 272 are executed to determine the average peak acceleration AVPACC and dynamic shift factor DSF based on the previous accumulated peak acceleration value ACCSUM. At initialization, the accumulated peak acceleration value from a previous period of operation is used, as noted above in reference to block 232. As indicated at block 272, the DSF determination may be a look-up table, as graphically illustrated in FIG. 6.

At the expiration of each acceleration interval, the blocks 274-286 are executed to update the accumulated peak acceleration value ACCSUM. At the outset, the blocks 274 and 276 are executed to increment the book-keeping term, #SAMPLES, corresponding to the number of acceleration intervals which have occurred in the current period of operation, and to reset the ACCEL TIMER to a new ratio-dependent value. In the illustrated embodiment, the ACCEL TIMER is initialized to approximately 0.5 sec in first gear, 1.0 sec in second gear, 2.0 sec in third gear, and a very long interval in fourth and fifth gears.

The block 278 then determines if various entry conditions are satisfied. These concern range selection, disengagement of the vehicle cruise control system, minimum vehicle speed, converter slip and engine throttle settings, service brake released and positive maximum peak acceleration MAXACCEL. If the conditions are not met, the accumulated peak acceleration value ACCSUM is not updated, and the block 280 is executed to clear the term MAXACCEL before continuing on to blocks 270-272. If the conditions are met, the blocks 282-286 are executed to update the accumulated peak acceleration ACCSUM. If the peak acceleration MAXACCEL is greater than the average peak acceleration AVPACC, ACCSUM is updated according to the expression:

$$ACCSUM = (ACCSUM + MAXACCEL)*[\#SAMPLES/(\#SAMPLES+1)]$$

If the peak acceleration MAXACCEL is less than or equal to the average peak acceleration AVPACC, ACCSUM is updated according to the expression:

$$ACCSUM = [ACCSUM + MAXACCEL + K(AVPACC - MAXACCEL)]*[\#SAMPLES/(\#SAMPLES+1)]$$

In the case of lower than average peak acceleration, the addition of the term K(AVPACC−MAXACCEL) partially offsets the reduced peak acceleration, effectively reducing the gain of accumulation for peak accelerations less than or equal to the average peak acceleration AVPACC. As noted above, this gives rise to the solid line characteristic depicted in FIG. 7.

Figure 10:
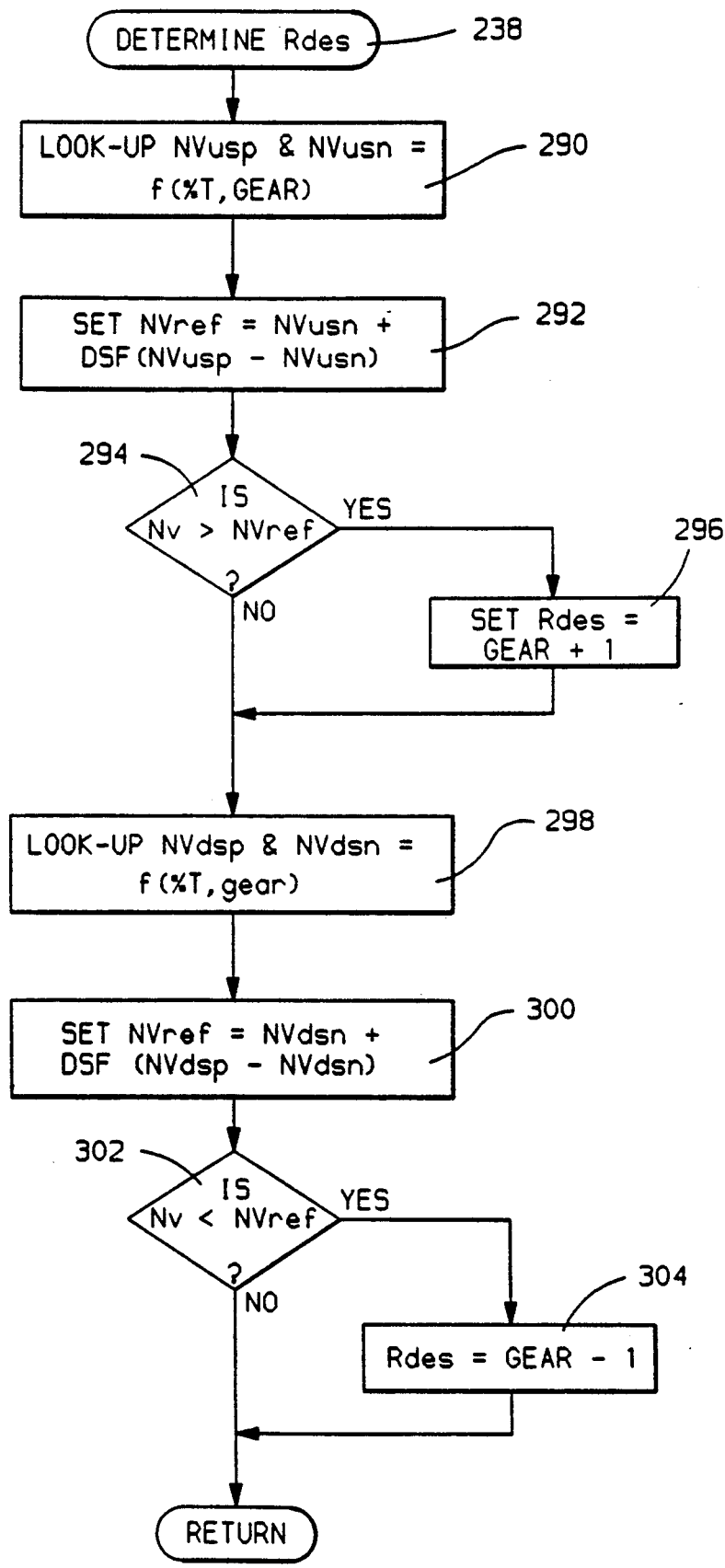

Referring now to the desired ratio determination flow diagram of FIG. 10, the block 290 is first executed to look-up the upshift threshold speeds for the Performance and Normal modes, NVusp and NVusn. As indicated in reference to FIGS. 4a-4b, the speed thresholds are determined by table look-up as a function of the engine throttle setting %T and the currently engaged speed ratio (GEAR). The block 292 then defines an upshift speed threshold NVref according to the expression:

$$NVref = NVusn + DSF(NVusp - NVusn)$$

This defines an upshift speed threshold ratiometrically spaced between the Normal and Performance mode speed thresholds NVusn, NVusp by the normalized dynamic shift factor DSF. If the vehicle speed Nv exceeds the reference NVref, as determined at block 294, the block 296 is executed to set the desired ratio Rdes to one ratio higher than the current ratio, GEAR.

Similarly, the blocks 298 and 300 are then executed to look-up the downshift threshold speeds for the Performance and Normal modes, NVdsp and NVdsn, and to define the downshift speed threshold NVref according to the expression:

$$NVref = NVdsn + DSF(NVdsp - NVdsn)$$

This defines a downshift speed threshold ratiometrically spaced between the Normal and Performance mode speed thresholds NVdsn, NVdsp by the normalized dynamic shift factor DSF. If the vehicle speed Nv falls below the reference NVref, as determined at block 302, the block 304 is executed to set the desired ratio Rdes to one ratio lower than the current ratio, GEAR.

Figure 11:
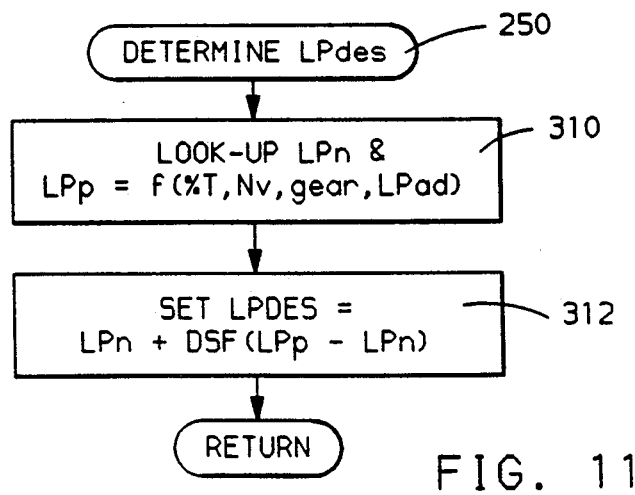

Referring to the line pressure determination flow diagram of FIG. 11, the block 310 is first executed to look-up the desired line pressures for the Performance and Normal modes, LPn and LPp. As indicated above, the line pressure is typically determined by table look-up as a function of vehicle speed Nv, engine throttle position %T, the currently engaged speed ratio (GEAR), and any adaptive correction LPad determined during prior upshifting. The adaptive correction values LPad are stored for each gear as a function of engine throttle. The block 312 then defines the desired line pressure LPdes according to the expression:

$$LPdes = LPn + DSF(LPp - LPn)$$

This defines a desired line pressure which is ratiometrically spaced between the Normal an Performance mode pressures LPn, LPp by the normalized dynamic shift factor DSF.

Figure 12:
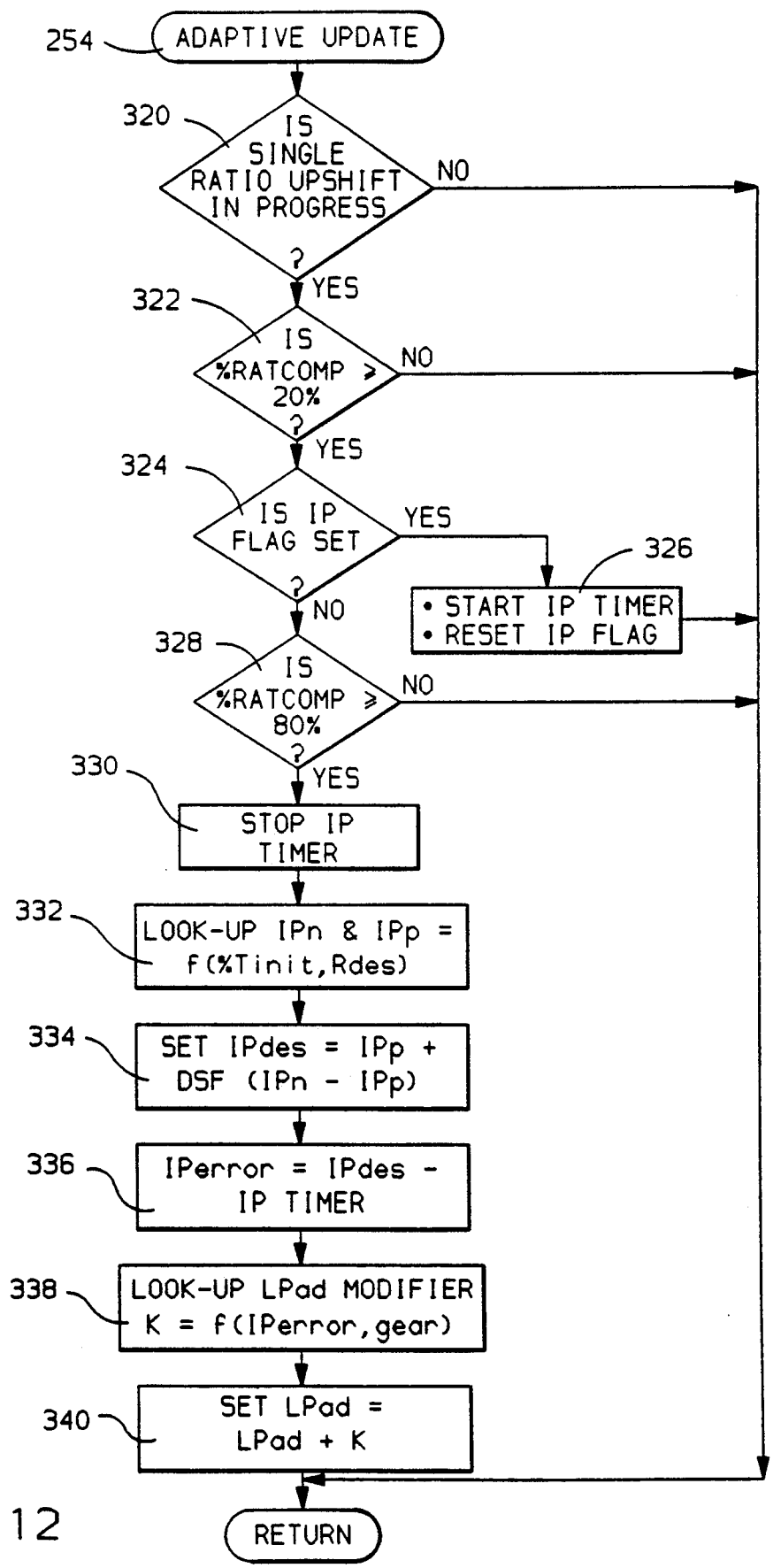

The Adaptive Update flow diagram of FIG. 12 determines the inertia phase time of each normal upshift through the use of an inertia phase timer IP TIMER, compares the measured time to a reference time IPdes, and updates the adaptive pressure term LPad. If a single ratio upshift is in progress, as determined at block 320, the blocks 322-330 are executed to determine the shift time—that is, the time required to progress from 20% ratio completion to 80% ratio completion. When %RATCOMP first reaches 20%, as determined at block 322, the IP FLAG is set, and the block 326 is executed to start the IP TIMER, and set the IP FLAG. Thereafter, block 324 will be answered in the negative, and when %RATCOMP reaches 80%, the blocks 330-340 are executed to stop the IP TIMER and complete the routine.

The blocks 332 and 334 operate to look-up the desired shift times IPn, IPp for the Normal and Performance modes, as a function of the initial throttle position %Tinit and the desired speed ratio Rdes, and to define a desired shift time IPdes according to the expression:

$$IPdes = IPp + DSF(IPn - IPp)$$

This defines a desired shift time for adaptive adjustment which is ratiometrically spaced between the Normal and Performance mode shift times IPn, IPp by the normalized dynamic shift factor DSF.

The block 336 then determines the shift time error IPerror by differencing IPdes and the interval measured by IP TIMER. The block 338 looks-up an adaptive line pressure modifier K as a function of the determined error IPerror and the currently engaged speed ratio, GEAR. Finally, the block updates the stored adaptive line pressure term LPad in accordance with the modifier K.

While this invention has been described in reference to the illustrated embodiment, it is expected that various modifications will occur to those skilled in the art. For example, the operator driving style indication may be based on various specified operating parameters of the vehicle, such as pedal movements, steering movements, engine load, etc. Moreover, various driver initiated overrides of the control could be provided. In this regard, it should be realized that controls incorporating such modifications may fall within the scope of this invention, which is defined by the appended claims.

The embodiments of the invention in which an exclusive property or privilege is claimed are defined as follows:

1. In a motor vehicle adapted to be driven by an operator, including transmission gear elements defining a plurality of forward speed ratios and control elements for shifting between speed ratios in response to predefined shift control parameters, first look-up means for storing a first set of shift control parameters for said control elements which set is suited for a normal driving style of said operator, and second look-up mans for storing a second set of shift control parameters for said control elements which is suited for a performance-oriented driving style of said operator, a method of operation comprising the steps of:

periodically measuring specified operating parameters of said vehicle to form a dynamic shift control signal indicative of a current driving style of said operator;

obtaining a first shift control parameter form said first look-up means and a second shift control parameter form said second look-up means; and ratiometrically determining a shift control parameter for said control elements intermediate said first and second shift control parameters based on said dynamic shift control signal, thereby to define a shift control parameter based on the driving style of said operator.

2. The method of operation set forth in claim 1, wherein said shift control parameter is a shift pattern value which determines the initiation of shifting between said speed ratios.

3. The method of operation set forth in claim 1, wherein said control elements include fluid pressure operated elements, and said shift control parameter represents a desired fluid pressure to be supplied to said fluid pressure operated elements.

4. The method of operation set forth in claim 1, wherein said dynamic shift control signal is normalized to form a dynamic shift factor which is applied to a difference between said first and second shift control parameters in the determination of said shift control parameter for said control elements.

5. In a motor vehicle adapted to be driven by an operator, including transmission gear elements defining a plurality of forward speed ratios, a source of fluid pressure, and fluid pressure operated control elements for shifting between speed ratios, first look-up means for storing a first desired pressure to be supplied to said control elements by said source when a normal driving style is employed by said operator, and second look-up means for storing a second desired pressure to be supplied to said control elements by said source when a performance-oriented driving style is employed by said operator, a method of operation comprising the steps of:

periodically measuring specified operating parameters of said vehicle to form a dynamic shift control signal indicative of a current driving style of said operator;

obtaining a first desired pressure form said first look-up means and a second desired pressure form said second look-up means; and ratiometrically determining a desired pressure to be supplied to said control elements by said source intermediate said first and second desired pressures based on said dynamic shift control signal, thereby to define a desired pressure based on the driving style of said operator.

6. The method of operation set forth in claim 5, where the vehicle includes third look-up means for storing a first desired shift time for use in adaptively adjusting the pressure supplied to said control elements when a normal driving style is employed by said operator, and fourth look-up means for storing a second desired shift time for use in adaptively adjusting the pressure supplied to said control elements when a performance-oriented driving style is employed by said operator, and the method of operation includes the steps of:

looking up first and second desired shift times from said third and fourth look-up means; and ratiometrically determining a desired shift time intermediate said first and second desired shift times based on said dynamic sift control signal, thereby to define a desired pressure based on the driving style of said operator.

* * * * *